(12) United States Patent
Lee

(10) Patent No.: US 7,349,694 B2
(45) Date of Patent: Mar. 25, 2008

(54) METHOD FOR OPERATING DATA COMMUNICATION SERVICE IN MOBILE COMMUNICATION SYSTEM

(75) Inventor: Dong Keun Lee, Seoul (KR)

(73) Assignee: LG Electronics Inc., Seoul (KR)

(*) Notice: Subject to any disclaimer, the term of this patent is extended or adjusted under 35 U.S.C. 154(b) by 198 days.

(21) Appl. No.: 10/737,212

(22) Filed: Dec. 15, 2003

(65) Prior Publication Data

US 2004/0127222 A1     Jul. 1, 2004

(30) Foreign Application Priority Data

Dec. 16, 2002 (KR) .................. 10-2002-0080475

(51) Int. Cl.
*H04Q 7/20* (2006.01)

(52) U.S. Cl. ................. 455/432.1; 455/433; 455/432.2

(58) Field of Classification Search ............ 455/432.1, 455/435.1, 439–441, 456.1, 456.5, 456.2, 455/432.3, 435.2, 456.3, 414.1, 414.3; 451/415
See application file for complete search history.

(56) References Cited

U.S. PATENT DOCUMENTS

| 6,427,076 | B2 * | 7/2002 | Skog ........................... 455/433 |
| 6,912,389 | B2 * | 6/2005 | Bright et al. ................ 455/433 |
| 2001/0012777 | A1 * | 8/2001 | Igarashi et al. ............. 455/435 |
| 2002/0065067 | A1 * | 5/2002 | Khare et al. ................ 455/414 |
| 2004/0072578 | A1 * | 4/2004 | Keutmann et al. ........ 455/456.1 |

FOREIGN PATENT DOCUMENTS

EP    1 322 130 A2    6/2003

WO    WO 03/028310 A1    4/2003

OTHER PUBLICATIONS

"Change Request 23.122 CR 16 rev 1 Current version 3.5.0: Roaming restriction for GPRS service" 3GPP TSG CN1 Meeting, No. 15, Jan. 15, 2001 (Jan. 15, 2001), pp. 1-14, XP002222097* pp. 1,7,8,12*.
"Digital cellular telecommunications system (Phase 2+) (GSM)" Dec. 2001 (Dec. 2001), ETSI Standards, European Telecommunications Standards Institute, Sophia-Antipo, FR, XP014007930 ISSN: 0000-0001 & the whole document*.
"Universal Mobile Telecommunications System (UMTS)" ETSI Standards, European Telecommunications Standards Institute, Sophia-Antipo, FR, vol. 3-CN1, No. 360, Mar. 2001 (Mar. 2001), XP014007764 ISSN: 0000-0001 * the whole document *.

* cited by examiner

*Primary Examiner*—Duc M. Nguyen
*Assistant Examiner*—Eric J Elcenko
(74) *Attorney, Agent, or Firm*—Lee, Hong, Degerman, Kang & Schmadeka

(57) ABSTRACT

A method for operating a data communication service in a global system for mobile communication is provided. The method comprises deciding whether a user equipment requests the data communication service in a real time; deciding whether the user equipment requests the data communication service in a home area of a first mobile switching center where the user equipment has been registered; deciding whether a reject data has been set in the user equipment in a pending status, if the user equipment requests the data communication service in the home area; and providing the data communication service to the user equipment, if the reject data has not been set in the user equipment.

5 Claims, 2 Drawing Sheets

METHOD FOR OPERATING DATA COMMUNICATION SERVICE IN MOBILE COMMUNICATION SYSTEM

CROSS REFERENCE TO RELATED APPLICATIONS

Pursuant to 35 U.S.C. § 119(a), this application claims the benefit of earlier filing date and right of priority to Korean Patent Application No. 2002-80475, filed on Dec. 16, 2002, the content of which is hereby incorporated by reference herein in its entirety.

BACKGROUND OF THE INVENTION

1. Field of the Invention

The present invention relates to a mobile communication system, and more particularly, to a method for operating a data communication service in a global system for mobile communication (GSM).

2. Description of the Related Art

In general, GSM is a digital system for operating limited frequency resources using time division multiple access (TDMA), enabling a plurality of mobile subscribers or user equipments (UE) to simultaneously communicate via a corresponding channel. The GSM is the standard used in mobile communication systems in Europe.

Because all countries in Europe adopt the GSM, the subscribers can use the same UE in any country and receive mobile communication services through their UE according to a roaming service. In addition, the subscribers can be directly provided with a voice communication service by carrying subscriber identity modules (SIM) to record their personal information such as international mobile subscriber identity (IMSI). As such, a subscriber can rent or use a UE in any country in Europe by connecting his SIM to the UE.

A data communication service provided by the GSM in Europe is called a general packet radio service (GPRS). The GPRS is provided only in home areas that are service areas of a mobile communication system where the UE has been registered. That is, the GPRS is not provided in roaming areas where the UE has not been registered. The GSM and the GPRS have been disclosed in the U.S. Pat. Nos. 6,208, 628 and 6,480,717. The home areas are service areas of a first mobile switching center (MSC) where the UE has been registered, and the roaming areas are service areas of a second MSC (GSM) where the UE has not been registered.

When the user attempts voice communication in a roaming area by using the GSM type UE, the user can use the voice communication according to the roaming service. However, a second MSC may not provide data communication service for GPRS. Accordingly, the MSC transmits a reject signal for rejecting the GPRS request to the UE. UE records and stores the reject signal in a memory area, so that the user cannot use the GPRS even in the home area. For example, when a UE that has recorded a reject signal (for example, 'GPRS service not allowed') requests GPRS in the home area, the first MSC in the home area rejects the GPRS request of the UE on the basis of the reject signal recorded in the UE.

In order for the UE recording the reject signal to use the GPRS in the home area, the reject signal must be deleted. For example, the user must delete the reject signal recorded in the memory of the UE with the help of a professional staff, or by temporarily turning off and on the UE. Accordingly, the conventional method for operating the data communication service in the GSM causes inconveniences to the users, and reduces reliability of the GSM.

SUMMARY OF THE INVENTION

An object of the present invention, in accordance with one or more embodiments, is to provide a method for operating a data communication service in a mobile communication system which can directly provide the data communication service to a user equipment of the mobile communication system when the user equipment moves from a roaming area to home area, by allowing the user equipment to record in a pending status a reject data transmitted when the user equipment requests the data communication service such as a general packet radio service in the roaming area.

A data communication method for providing voice and data service to a mobile communication device, the method comprising receiving a request for data service from the mobile communication device determining if the mobile communication device is registered to a home network determining if reject data is stored in the mobile communication device, in pending status determining if the mobile communication device is registered to a first mobile service center (MSC).

The method of claim 1, further comprises providing data service to the mobile communication device, if reject data is not stored in the mobile communication device, in one embodiment.

Data service is provided to the mobile communication device, if reject data is stored in the mobile communication device in pending status and the mobile communication device is registered to the first MSC. The reject data is transmitted to the mobile communication device, if the mobile communication device is not registered to the home network.

In one embodiment, the reject data is transmitted to the mobile communication device, if the mobile communication device is not registered to the first MSC, and the reject data is set to pending status. The reject data is stored in a memory of the mobile communication device, thereafter. In certain embodiments, the data service comprises general packet radio service (GPRS).

In accordance with another embodiment, a data communication method for providing voice and data service to a mobile communication device is provided. The method comprises transmitting a request for data service to a base station in a first MSC; wherein the BS determines if the mobile communication device submitting the request is registered to a home network; and if reject data is stored in the mobile communication device, in pending status; and if the mobile communication device is registered to the first MSC.

The mobile communication device receives access to data service, if reject data is not stored in the mobile communication device or if reject data is stored in the mobile communication device in pending status and the mobile communication device is registered to the first MSC. The mobile communication device receives the reject data from the BS, if the mobile communication device is not registered to the home network, or from the BS, if the mobile communication device is not registered to the first MSC. In one embodiment, the reject data is set to pending status, and is stored in memory.

In another embodiment, a method for operating a data communication service in a mobile communication system, comprises: transmitting a reject data for rejecting data communication service to a user equipment, if the user equipment registered in a first mobile switching center requests the data communication service in a roaming area of a second mobile switching center; and setting the reject data in a pending status.

In some embodiment, the method further comprises providing the data communication service on the basis of the reject data set in the pending status; if the user equipment requests the data communication service in a home area of the first mobile switching center. The data communication service is a general packet radio service provided by the mobile communication system.

In one or more embodiments, providing the data communication service comprises deciding whether the user equipment has been registered in the first mobile switching center, if the user equipment moves to the home area of the first mobile switching center; and providing the data communication service to the user equipment, if the user equipment has been registered in the first mobile switching center.

If the user equipment is located in the home area of the first mobile switching center and has not been registered in the first mobile switching center, the data communication service is rejected. If the reject data has not been set in the user equipment, the data communication service is provided to the user equipment. The reject data is stored in a memory of the user equipment as a pending signal, in some embodiments.

In accordance with another embodiments, a method for operating a data communication service in a global system for mobile communication comprises deciding whether a user equipment requests the data communication service in a real time deciding whether the user equipment requests the data communication service in a home area of a first mobile switching center where the user equipment has been registered deciding whether a reject data has been set in the user equipment in a pending status, if the user equipment requests the data communication service in the home area and providing the data communication service to the user equipment, if the reject data has not been set in the user equipment.

The method may further comprise deciding whether the user equipment has been registered in the first mobile switching center, if the reject data has been set in the user equipment in the pending status providing the data communication service to the user equipment, if the user equipment has been registered in the first mobile switching center and transmitting a reject data for rejecting the data communication service to the user equipment, if the user equipment registered in the first mobile switching center requests the data communication service in a roaming area of a second mobile switching center.

These and other embodiments of the present invention will also become readily apparent to those skilled in the art from the following detailed description of the embodiments having reference to the attached figures, the invention not being limited to any particular embodiments disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

Features, elements, and aspects of the invention that are referenced by the same numerals in different figures represent the same, equivalent, or similar features, elements, or aspects in accordance with one or more embodiments of the system.

DETAILED DESCRIPTION OF THE PREFERRED EMBODIMENTS

A method for operating a data communication service in a GSM allows users to easily use the data communication service by setting a reject data inputted from a roaming area GSM in a pending status. When a UE registered in a home area GSM requests a data communication service in the roaming area, the system provides the data communication service to the UE on the basis of a pending reject data recorded in the UE.

Figure 1:
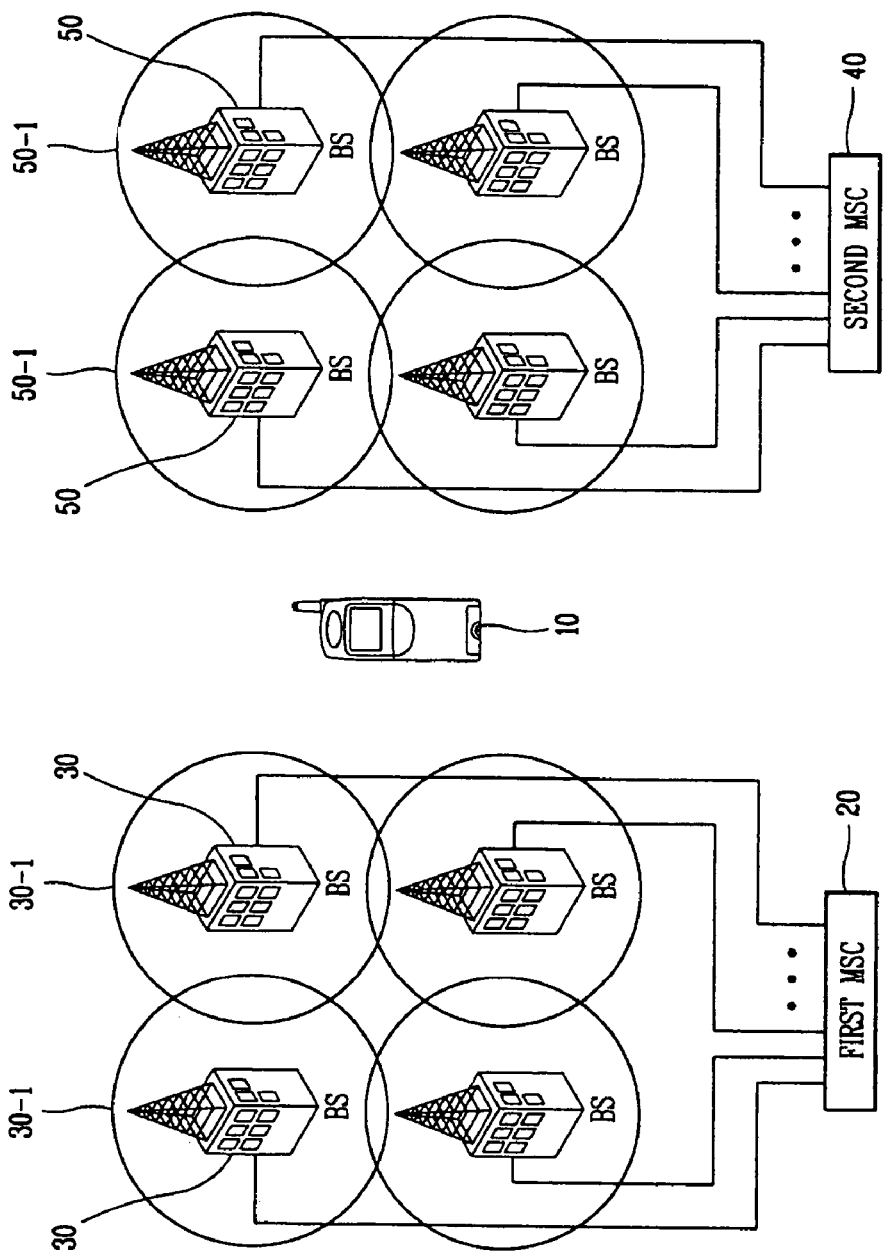
FIG. 1 is a block diagram illustrating a GSM communications network adopting the system and method of the present invention, in accordance with one embodiment.

Referring to FIG. 1, the GSM network comprises a first mobile switching center (MSC) 20 for registering an UE 10, and providing mobile communication services (voice communication service and data communication service) to the registered UE 10 through a plurality of base stations (BS) 30. The UE 10 is registered in the first MSC 20, moving in a home area of the first MSC 20 to perform wireless voice communication and wireless data communication. The UE 10 includes a subscriber identify module (SIM) for recording international mobile subscriber identity (IMSI) and subscriber personal information.

A second MSC 40 provides the voice communication service to the UE 10 registered in the first MSC 20 through a plurality of BS 50, when the UE 10 enters a roaming area. When the UE 10 registered in the first MSC 20 requests service from the second MSC 40 in the roaming area, the UE 10 receives a reject data or reject signal from the second MSC 40.

In accordance with one embodiment, the UE sets the reject data in a pending status. Setting the reject data in the pending status means receiving the reject data and changing a network status of the UE to a GPRS pending roaming network status. When the UE 10, registered in the first MSC 20, enters the home area, the first MSC 20 directly provides the data communication service to the UE 10 on the basis of the pending reject data set in the UE 10. The data communication service implies a general packet radio service (GPRS) provided by the GSM.

The first MSC 20 monitors and controls a plurality of base stations (BSs) 30. Each BS forms a plurality of home areas 30-1 for providing the mobile communication services to the UE 10 registered in the first MSC 20. The mobile communication services include the voice communication service and the data communication service. The UE 10 is registered in the first MSC 20, and receives the mobile communication services in the home areas 30-1 which are service areas of the first MSC 20.

Thereafter, when the UE 10 moves to roaming areas 50-1 formed by the plurality of BSs 50 of the second MSC 40, and requests mobile communication services from second MSC 40, the second MSC 40 provides only the voice communication service to the UE 10 through the BS 50. In some embodiments, the first MSC 20 and the second MSC 40 are identical GSM, and provide a roaming service, so that subscribers registered in the other system according to different contracts can use the voice communication service in their own service areas. In addition, the GSM type UE 10 is connected to the SIM for recording 15 unit international mobile subscriber identity (IMSI) for distinguishing subscribers or users, subscriber personal information and payment account number, for example.

In one embodiment, the user of the GSM type UE 10 registered in the first MSC 20 who receives the mobile communication services in the home area 30-1 can move to the roaming area 50-1 which is a service area of the second MSC 40 and receive the voice communication service. The first MSC 20 and the second MSC 40 share a database (not shown) for recording registration information of the UE 10 in order to confirm whether the user of the UE 10 intending to use the roaming service has been registered.

Accordingly, the UE 10 registered in the first MSC 20 can be provided with the voice communication service and the data communication service (GPRS) in the home areas 30-1, but only the voice communication service is provided in the roaming areas 50-1. That is, in the roaming areas 50-1, the UE 10 will receive reject data when requesting GPRS service.

When the UE 10 receives the reject data in the roaming area, the UE 10 records the reject data as a pending signal. That is, the UE 10 converts the reject data into a pending signal and records the pending signal. In the case that the UE 10 receives the reject data in the roaming area and feeds back to the home area, the UE 10 can receive the GPRS from the first MSC 20. Therefore, the user of the UE 10 does not have to turn on/off the UE 10 to use the GPRS.

Figure 2:
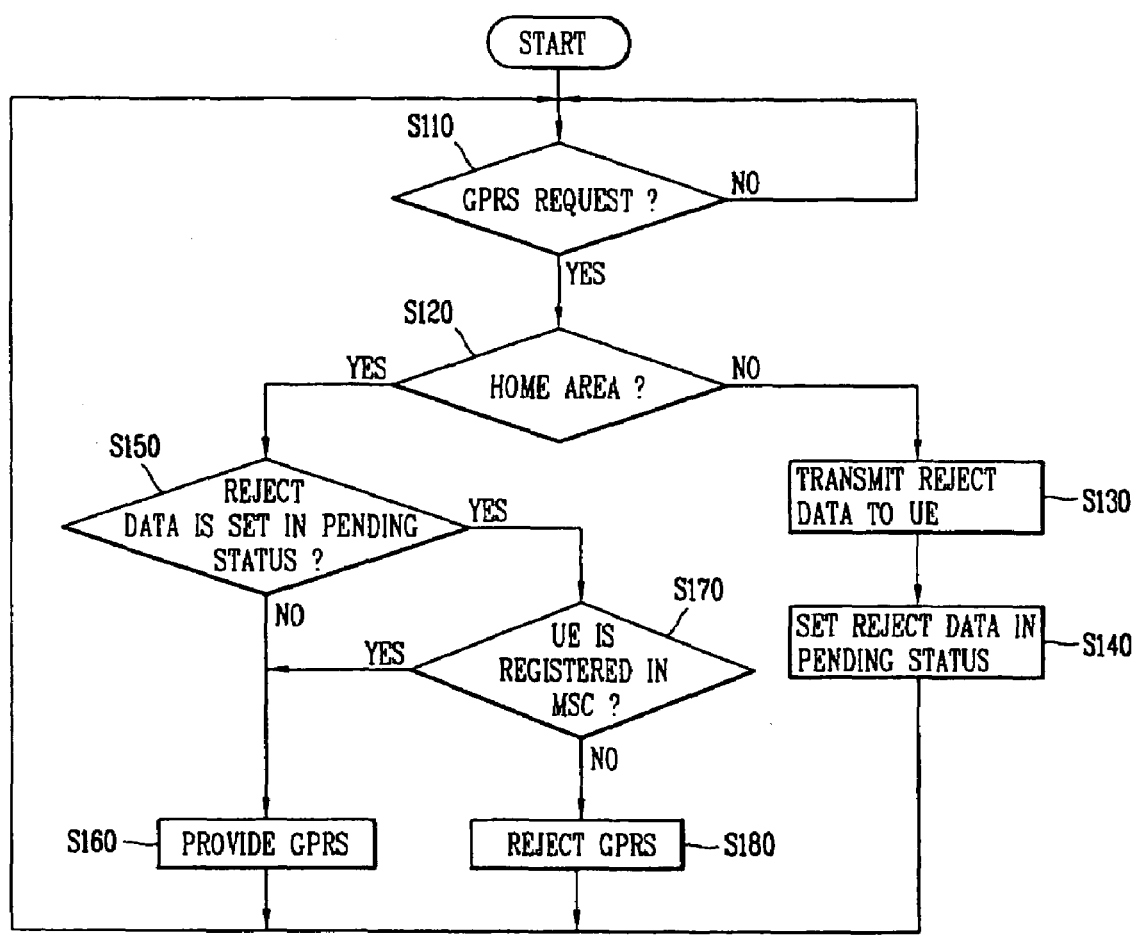
FIG. 2 is a flowchart illustrating a method for operating GPRS in a GSM communications network, in accordance with one embodiment of the present invention.

Referring to FIG. 2, in accordance to one embodiment, the method for operating the GPRS in the GSM comprises: deciding whether the UE 10 requests GPRS in a real time (S110); deciding whether the UE 10 requests the GPRS in the home area; (S120); when the UE 10 requests GPRS in the home area, deciding whether the reject data has been set in the UE 10 in a pending status (S150); when the reject data has not been set in the UE 10, providing GPRS to the UE 10 (S160).

When the reject data has been set in the UE 10 in the pending status, the system decides whether the UE 10 is registered in the first MSC 20 (S170); when the UE 10 has been registered in the first MSC 20, providing the GPRS to the UE 10 (S160); when the UE 10 has not been registered in the first MSC 20, rejecting the GPRS to the UE 10 (S180); when the UE 10 requests the GPRS in the roaming area of the second MSC 40, transmitting reject data for to the UE 10 (S130); setting the reject data in the pending status and storing the setting information in a memory (not shown) of the UE 10 (S140).

Accordingly, in one embodiment, the first and second MSC 20 and 40 decide whether the UE 10 requests the GPRS to perform digital data communication (S100). Then, the first and second MSC 20 and 40 decide whether the UE 10 requests the GPRS in the home area 30-1 or roaming area 50-1 (S120). The home areas 30-1 are service areas of the first MSC 20 where the UE 10 has been registered, and the roaming areas 50-1 are service areas of the second MSC 40 where the UE 10 has not been registered.

When the UE 10 requests the GPRS in the home area 30-1, the first MSC 20 decides whether the reject data has been set in the UE 10 in the pending status (S150). If the reject data has not been set in the UE 10, the first MSC 20 provides the GPRS to the UE 10. If the reject data has been set in the UE 10 in the pending status, however, the first MSC 20 decides whether the UE has been registered to receive the GPRS. The first MSC 20 decides whether the UE 10 has been registered according to the registration information of the database (S170).

If the UE 10 has been registered in the database of the first MSC 20 to receive the GPRS, the first MSC 20 provides the GPRS to the UE 10. If the UE 10 has not been registered in the database of the first MSC 20 to receive the GPRS, the first MSC 20 rejects the GPRS and feeds back to S110. If UE 10 requests the GPRS in the roaming area, the second MSC 40 wirelessly transmits the reject data for rejecting the GPRS to the UE 10, because the UE 10 located in the roaming area has not been registered in the database of the second MSC 40 (S130). The UE 10 records and stores the reject data in a corresponding memory area in the pending status (S140).

Accordingly, when the UE registered in the home area GSM requests the GPRS in the roaming area, the UE receives the reject data from the roaming area GSM, and sets the reject data in the pending status. When the UE registered in the home area GSM enters the home area, the GSM directly provides the GPRS to the UE on the basis of the pending reject data set in the UE. As such, setting the reject data in the pending status means receiving the reject data and changing a network status of the UE to a GPRS pending roaming network status.

As discussed earlier, in accordance with the present invention, the reject data transmitted when the UE requests the GPRS in the roaming area of the GSM is recorded as a pending signal. The GPRS is provided to the UE in the home area on the basis of the pending signal to allow the users to easily use the GPRS and improve reliability of the GSM.

The embodiments described above are to be considered in all aspects as illustrative only and not restrictive in any manner. Thus, other exemplary embodiments, system architectures, platforms, and implementations that can support various aspects of the invention may be utilized without departing from the essential characteristics described herein. These and various other adaptations and combinations of features of the embodiments disclosed are within the scope of the invention. The invention is defined by the claims and their full scope of equivalents.

What is claimed is:

1. A method for operating a data communication service in a mobile communication system, the method comprising:
    transmitting a reject data for rejecting data communication service to a user equipment, when the user equipment registered in a first mobile switching center requests the data communication service in a roaming area of a second mobile switching center;
    setting the reject data to a pending status in the user equipment;
    checking whether the reject data has been set in the user equipment in the pending status when the user equipment requests the data communication service in a home area of the first mobile switching center;
    determining whether the user equipment has been registered in the first mobile switching center when the reject data has been set in the user equipment in the pending status; and
    providing the data communication service to the user equipment when the user equipment has been registered in the first mobile switching center.

2. The method of claim 1, wherein the data communication service is a general packet radio service provided by the mobile communication system.

3. The method of claim 1, further comprising:
    rejecting the data communication service, when the user equipment is located in the home area of the first mobile switching center and has not been registered in the first mobile switching center.

4. The method of claim 1, further comprising:
providing the data communication service to the user equipment, when the reject data has not been set in the user equipment.

5. The method of claim 1, wherein the reject data is stored in a memory of the user equipment as a pending signal.

* * * * *